(12) United States Patent
Brinkley et al.

(10) Patent No.: US 9,789,804 B2
(45) Date of Patent: Oct. 17, 2017

(54) CURVED LOAD SUPPORT FOR USE ON A VEHICLE

(71) Applicants: Eddie Clifton Brinkley, Lexington, NC (US); Chadwick Clifton Brinkley, Thomasville, NC (US)

(72) Inventors: Eddie Clifton Brinkley, Lexington, NC (US); Chadwick Clifton Brinkley, Thomasvile, NC (US)

( * ) Notice: Subject to any disclaimer, the term of this patent is extended or adjusted under 35 U.S.C. 154(b) by 252 days.

(21) Appl. No.: 14/592,164

(22) Filed: Jan. 8, 2015

(65) Prior Publication Data

US 2015/0122859 A1    May 7, 2015

Related U.S. Application Data

(63) Continuation of application No. 13/919,075, filed on Jun. 17, 2013, now Pat. No. 8,919,627.

(51) Int. Cl.
| | |
|---|---|
| *B60R 9/06* | (2006.01) |
| *B60P 3/10* | (2006.01) |
| *B60R 9/08* | (2006.01) |
| *B60P 3/40* | (2006.01) |
| *B23P 19/04* | (2006.01) |

(52) U.S. Cl.
CPC ............ *B60P 3/1066* (2013.01); *B23P 19/04* (2013.01); *B60P 3/10* (2013.01); *B60P 3/40* (2013.01); *B60R 9/06* (2013.01); *B60R 9/065* (2013.01); *B60R 9/08* (2013.01); *Y10T 29/49826* (2015.01); *Y10T 29/49904* (2015.01); *Y10T 29/49947* (2015.01)

(58) Field of Classification Search
CPC .... B60R 9/06; B60R 9/10; B60R 9/08; B60R 9/065; B60P 3/1066; B60P 3/10; B60P 3/40; B23P 19/04
USPC .................. 224/519, 561, 596; 206/596, 386
See application file for complete search history.

(56) References Cited

U.S. PATENT DOCUMENTS

| | | | | |
|---|---|---|---|---|
| 4,274,262 | A * | 6/1981 | Reed ........................ | F25B 21/02 62/3.64 |
| 4,593,840 | A * | 6/1986 | Chown ..................... | B60R 9/06 224/484 |
| 4,744,590 | A * | 5/1988 | Chesney ................... | B60R 9/06 224/520 |
| 5,024,359 | A * | 6/1991 | Thomas .................... | B62J 7/06 224/414 |
| 5,586,702 | A * | 12/1996 | Sadler ....................... | B60R 9/06 224/281 |

(Continued)

*Primary Examiner* — Adam Waggenspack
*Assistant Examiner* — Lester L Vanterpool
(74) *Attorney, Agent, or Firm* — Robert W. Pitts (57) ABSTRACT

A portable container assembly that can include a wheeled hand cart for transporting articles mounted on a platform or basket can be mounted in an elevated, horizontal position on the rear of a vehicle. The hand cart includes a downwardly facing channel that can be aligned with and inserted over a support bar extending from the rear of a hitch receiver on a vehicle. Upright handles on the hand cart supply sufficient mechanical advantage to allow the user to first tilt the and cart, and when the channel is aligned with the support bar, the hand cart can be rotated so that it is lifted into position and supported by the support bar on a vehicle. The support bar is attachable to and detachable from a conventional hitch receiver. A cooler can also be mounted directly to and supported only by the hitch extension.

20 Claims, 11 Drawing Sheets

(56) References Cited

U.S. PATENT DOCUMENTS

| | | | | |
|---|---|---|---|---|
| 5,683,097 A * | 11/1997 | Fenton | ...................... | A45C 5/14 |
| | | | | 280/47.26 |
| 5,881,937 A * | 3/1999 | Sadler | ..................... | B60R 9/065 |
| | | | | 224/509 |
| 7,156,273 B2 * | 1/2007 | Morris | ..................... | B60R 9/06 |
| | | | | 108/14 |
| 7,341,417 B1 * | 3/2008 | Lohr | ........................ | B60R 9/06 |
| | | | | 224/506 |
| 8,061,572 B2 * | 11/2011 | Myrex | ..................... | B60R 9/06 |
| | | | | 224/502 |
| 2003/0057245 A1 * | 3/2003 | Dean | ........................ | B60R 9/06 |
| | | | | 224/519 |
| 2004/0173654 A1 * | 9/2004 | McAlister | ................ | B60D 1/52 |
| | | | | 224/519 |
| 2006/0261111 A1 * | 11/2006 | McCoy | .................. | B60R 9/065 |
| | | | | 224/499 |
| 2008/0296300 A1 * | 12/2008 | Paulen | .................. | B65D 5/748 |
| | | | | 220/277 |
| 2009/0152314 A1 * | 6/2009 | Myrex | ................... | B60R 9/065 |
| | | | | 224/502 |
| 2013/0068813 A1 * | 3/2013 | Choates | .................. | B62J 9/001 |
| | | | | 224/413 |

\* cited by examiner

CURVED LOAD SUPPORT FOR USE ON A VEHICLE

CROSS REFERENCE TO PRIOR CO-PENDING APPLICATION

This application claims benefit of U.S. Provisional Patent Application 61/925,691 filed Jan. 10, 2014.

BACKGROUND OF THE INVENTION

Field of the Invention

This invention is related to a wheeled or rolling hand cart or hand truck of the type used to manually move articles from place to place. This invention is also related a hand cart that can be rotated into an elevated, horizontal position on the rear of a vehicle for moving the articles loaded on the hand cart from site to site, without requiring the user to lift the hand cart or the articles loaded thereon.

Description of the Prior Art

Hand carts or hand truck are commonly employed to manually transport articles from place to place at a job site or in a warehouse. Normally articles are loaded onto a base or platform of a two wheeled hand cart, and the cart is tilted back so that the hand cart can be pushed from place to place. However, if the articles need to be transported by vehicle from place to place, the articles hand cart must be unloaded from the hand cart and loaded onto the vehicle at the first location and it may be necessary to load the articles loaded back onto a hand truck at the second location.

It has been suggested extra work could be avoided by merely loading the articles onto a vehicle while still loaded on the hand truck. However, it is often difficult to lift such loads in the first place and the additional weight of the hand cart can make loading even more difficult. There have been a number of suggestions to include a feature on the hand truck that could shifted to allow the user to more easily raise a loaded hand truck. U.S. Pat. No. 6,935,656 is one example of a hitch mountable utility cart by raising and lowering the cart frame relative to the wheelbase of the cart. Such devices, however require additional movable parts on a hand cart. Other devices for mounting a hand cart or other wheeled device on the rear of a motor vehicle or similar vehicle are found in the following US Patents and Published Patent Applications. U.S. Pat. No. 5,529,231; U.S. Pat. No. 5,567,107; U.S. Pat. No. 5,738,261; U.S. Pat. No. 6,254,117; U.S. Pat. No. 6,612,615; U.S. Pat. No. 7,341,417: and US Patent Application Publication 2004/0164114. These devices employ hinged or movable components. The instant invention provides a wheeled hand cart that can be lifted into an elevated, horizontal position on a vehicle, such as a truck, sports utility vehicle or off road vehicle, my providing a mechanical advantage to allow the hand cart to be lifted without removing articles stored on the truck. Such a wheeled hand cart would be especially suited for use by sportsmen, who often use four wheeled devices that they have specially constructed to carry equipment. Such devices are often employed by surf fishermen. However, these types of devices do not address the need to load and unload the cart on another vehicle without first unloading the cart itself. The instant invention is believed to supply such a device that is easy to use, but not expensive to construct.

SUMMARY OF THE INVENTION

According to this invention, a portable cooler can be mounted on a support bar extending rearwardly from a vehicle. The portable cooler includes a container base and a container lid. A channel extends into a bottom surface of the container base between a front and a rear face of the container base. A notch extends along the front face where the front face intersects the bottom surface. The notch extends laterally beyond the channel. Ears are located on each side of the channel and protrude into the notch. Aligned holes extend through the ears. The notch is wide enough to provide clearance for insertion of a pin through the holes in the ears. The cooler can be mounted on only a single support bar attached to the vehicle and extending through the channel with the pin extending through the bar and into the holes in the ears to secure the cooler to the support bar.

This invention also comprises as assembly including the single support bar mountable to and extending from a receiver hitch on a vehicle, and a container, such as a cooler that can be mounted and supported only by the single support bar.

BRIEF DESCRIPTION OF THE DRAWINGS

FIGS. 12A-12D show a second embodiment of this invention.

FIGS. 13A-13F are views of the basket of the second embodiment of the hand cart.

DETAILED DESCRIPTION OF THE PREFERRED EMBODIMENT

Figure 1:
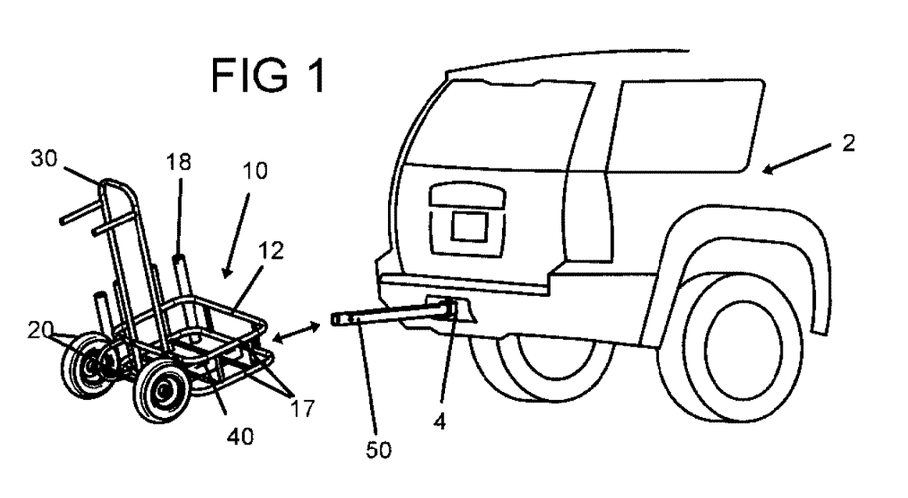
FIG. 1 is a view showing the manner in which a first embodiment of the wheeled hand cart according to this invention would be aligned with a support bar extending from a trailer hitch receiver so that the wheeled hand cart, along with its contents, can be mounted on the rear of a vehicle.
Figure 2:
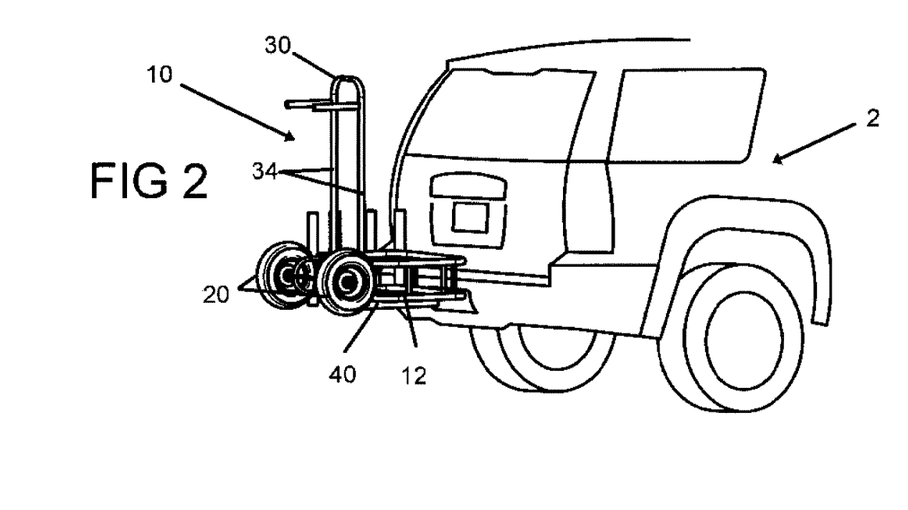
FIG. 2 is a view of the wheeled hand cart of FIG. 1 after the cart has been mounted on the support bar at the rear of the vehicle.
Figure 3:
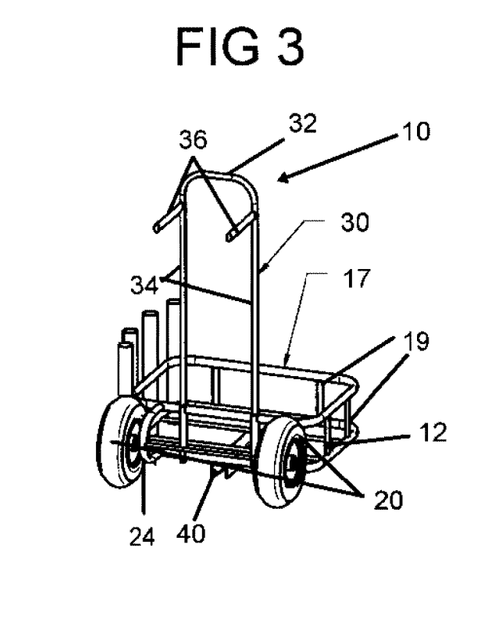
FIG. 3 is a three dimensional view of the wheeled hand cart of FIGS. 1 and 2 viewed from its rear.
Figure 4:
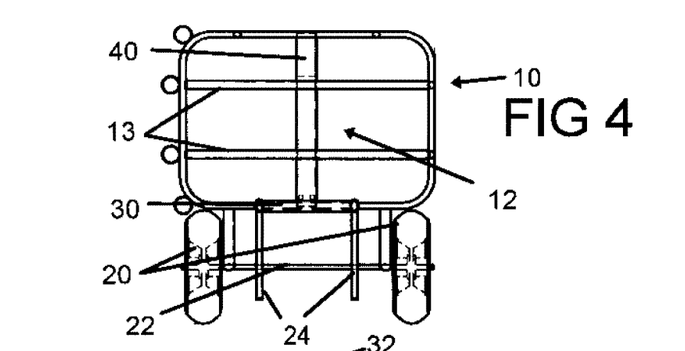
FIG. 4 is a top plan view of the wheeled hand cart of FIGS. 1 and 2.
Figure 5:
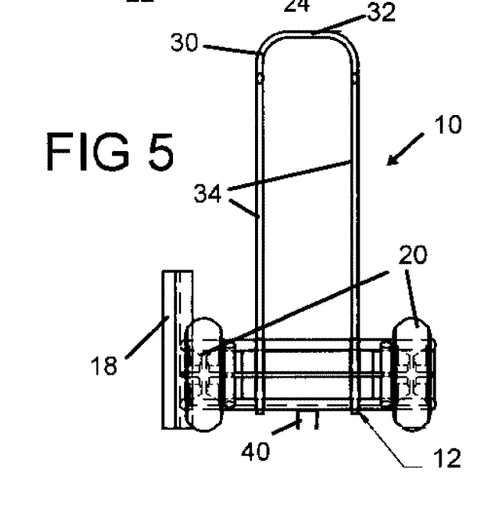
FIG. 5 is a rear view of the wheeled hand cart of FIGS. 1 and 2.

The wheeled hand cart 10 comprising the first embodiment of this invention allows its user to lift the cart 10, along with contents loaded on the cart 10, onto a support bar 50 extending from a conventional hitch receiver 4 on the rear of a vehicle 2, which can be a motor vehicle as shown in FIGS. 1 and 2 or a trailer or other powered or unpowered vehicle. The combination of the wheeled hand cart 10 and a support bar 50 mounted in the hitch receiver results in a mechanical advantage that allows the user to first tilt the cart 10 and then rotate the cart into an elevated, horizontal position so that the hand cart 10 can be carried from place to place by the vehicle. The hand cart 10 is rotated into the elevated, horizontal position and it does not require the user to manually lift the cart 10 and its contents. Although especially suited for outdoor activities, such as fishing, the wheeled hand cart 10 is not limited to this singular use.

Wheeled or rolling hand cart 10 includes a basket 12 that forms the base or shelf or platform for carrying articles, such as ice chests, boxes, or bulky materials having a generally rectangular shape. In the preferred version of hand cart 10, the loaded surface area measures approximately twenty-eight (28) inches from side to side and the dimension of the basket 12 from front to back is approximately nineteen (19) inches. Upper and lower rails 17, in the form of tubular members extend around the periphery of the basket 12 with two tubes or stringers 13 forming the lower or bottom 14 of basket 12. A series of vertical tubes 19 extend between the upper and lower rails. When the wheeled hand cart 10 is used for fishing, tubular rod holders 18 can be mounted along the outside of the rails 17. The various tubes can be made a number of metal, and one suitable metal for the embodiment of FIGS. 1-11 would be stainless steel. The components can be welded together or they can be snap fit together or in some cases, fasteners, such a screws, can be employed to assembly this hand cart 10.

Figures 10, 11:
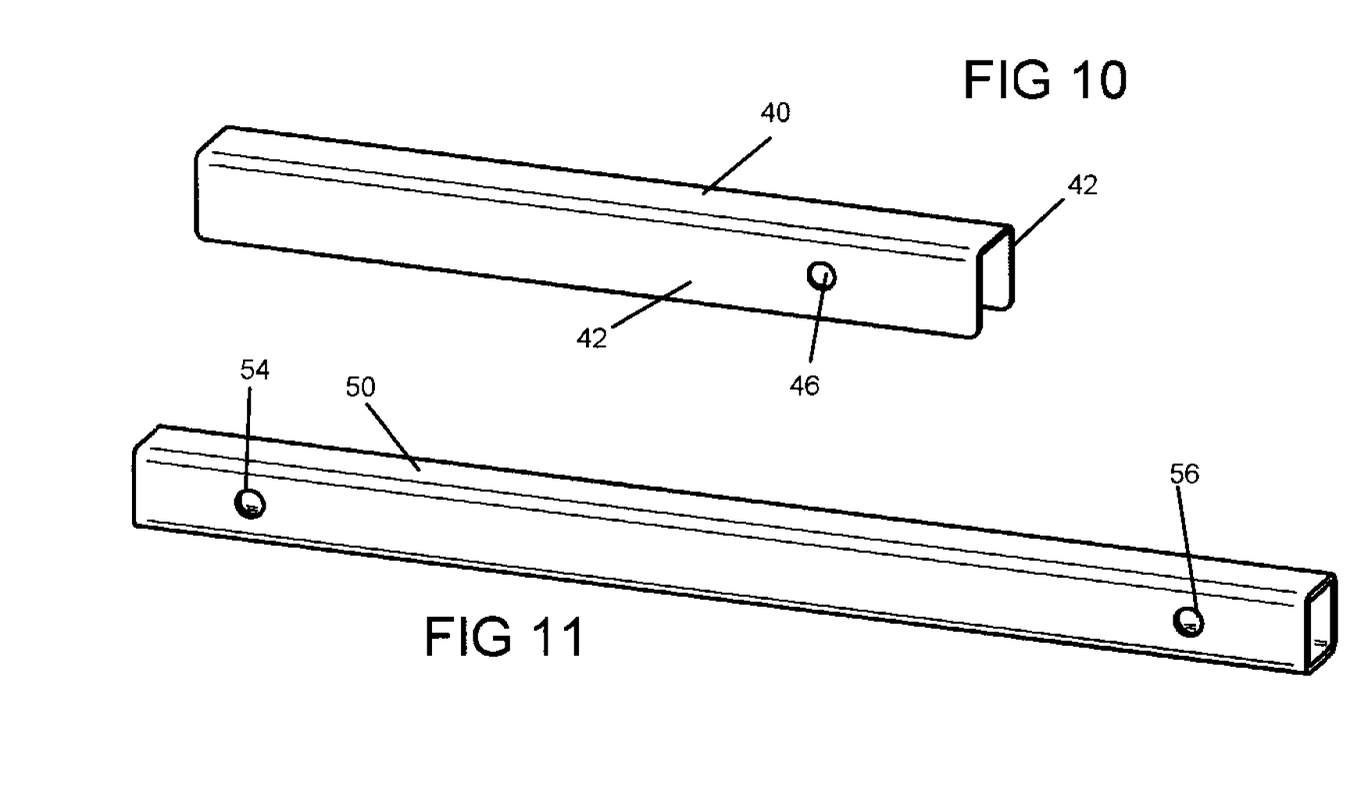
FIG. 10 is a view of the channel, which will extend from the front to the rear when mounted along the bottom of the basket of FIG. 7.
FIG. 11 is a view of the support bar, which will be mounted in the hitch receiver on a vehicle, and which will be received in the channel shown in FIG. 10 to mount the wheeled hand cart on a vehicle.
Figure 12A:
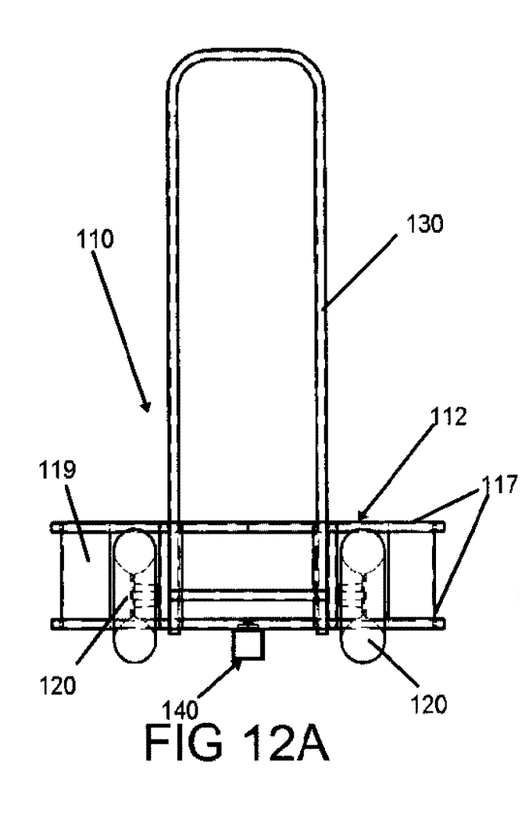
FIG. 12A is a rear view of the hand cart of the second embodiment.
Figures 12B, 12C, 12D:
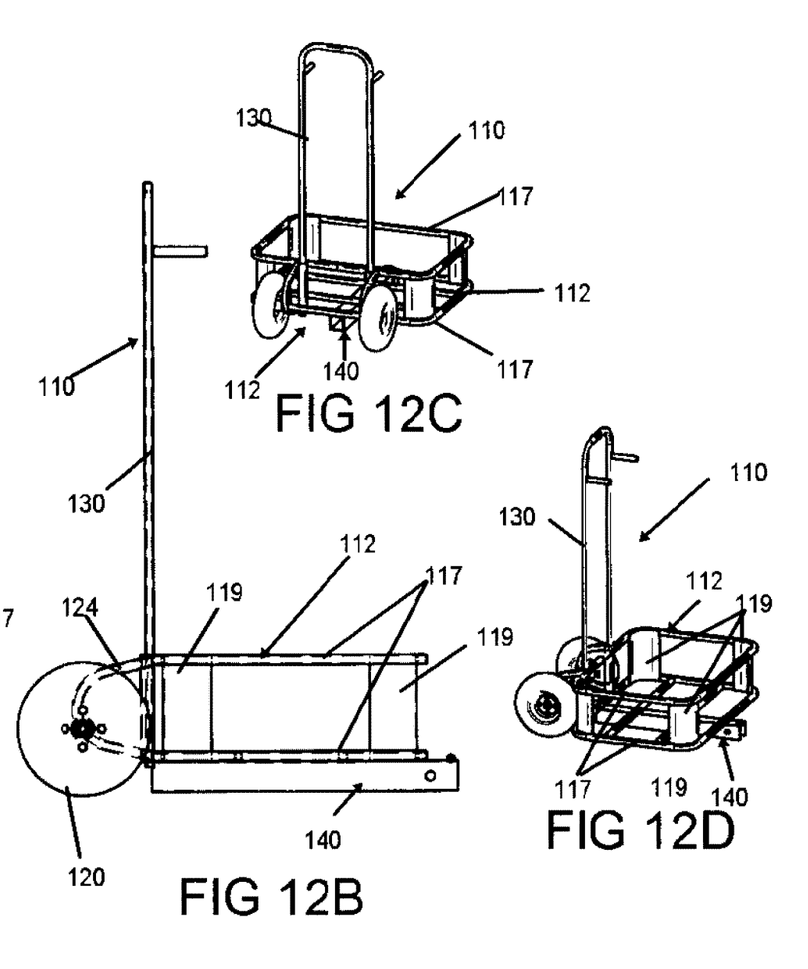
FIG. 12B is a side view of the same wheeled hand cart.
FIG. 12C is a three dimensional view of this second hand cart seen basically from its rear.
FIG. 12D is another three dimensional view in which the front of the cart is seen.
Figures 13A, 13B, 13C, 13D, 13E, 13F:
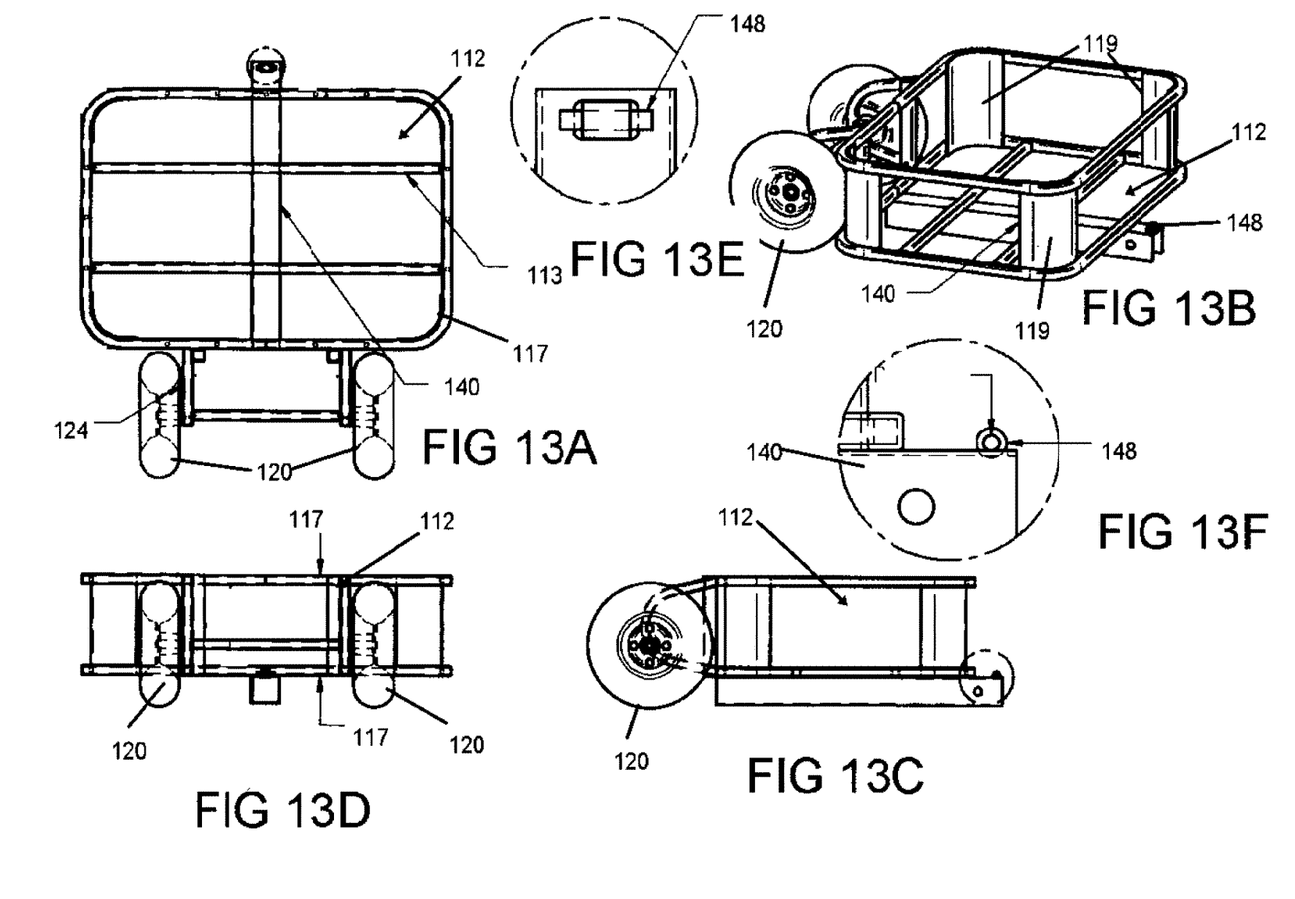
FIG. 13A is a top plane view.
FIG. 13B is a three dimensional view of the basket.
FIG. 13C is a side view of this basket.
FIG. 13D is a rear view.
FIG. 13E is detail top plan view of a roller or roller bearing mounted adjacent the leading end of the channel supporting the basket.
FIG. 13F is a detail side view of this roller.
Figure 14:
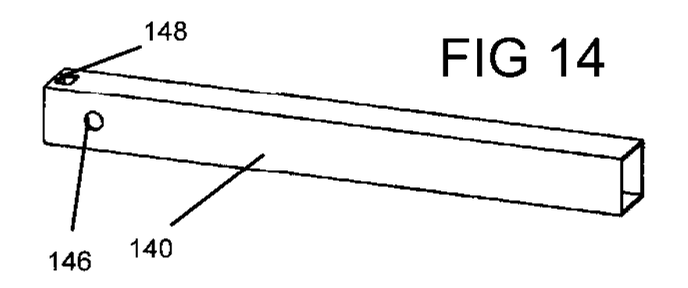
FIG. 14 is a three dimensional view of the channel used with the embodiment of FIGS. 12 and 13.
Figure 15:
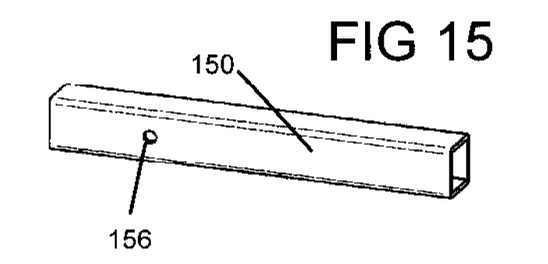
FIG. 15 is a three dimensional view of a support bar used with the channel of FIG. 14.
Figure 16A:
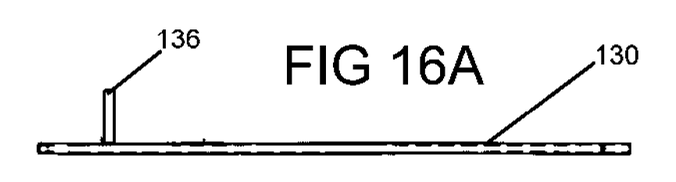
FIG. 16A is a side view of the handle and FIG. 16B is a three dimensional view of this handle that is used in the embodiment of FIGS. 12-15.
Figure 16B:
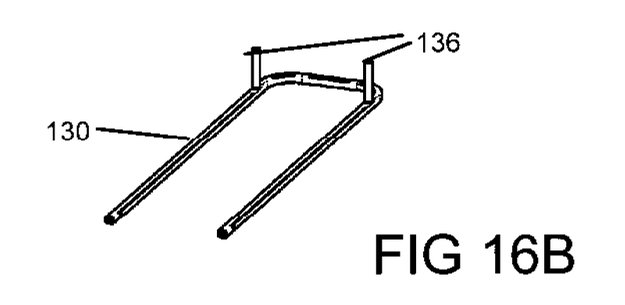
Figure 17:
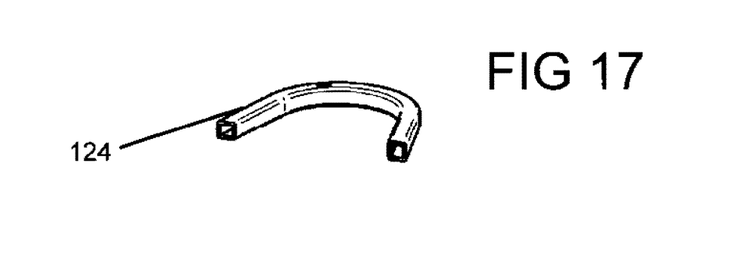
FIG. 17 is a three dimension view of one of the gussets on which the wheels are mounted in the embodiment of FIGS. 12-16.
Figures 18, 19A:
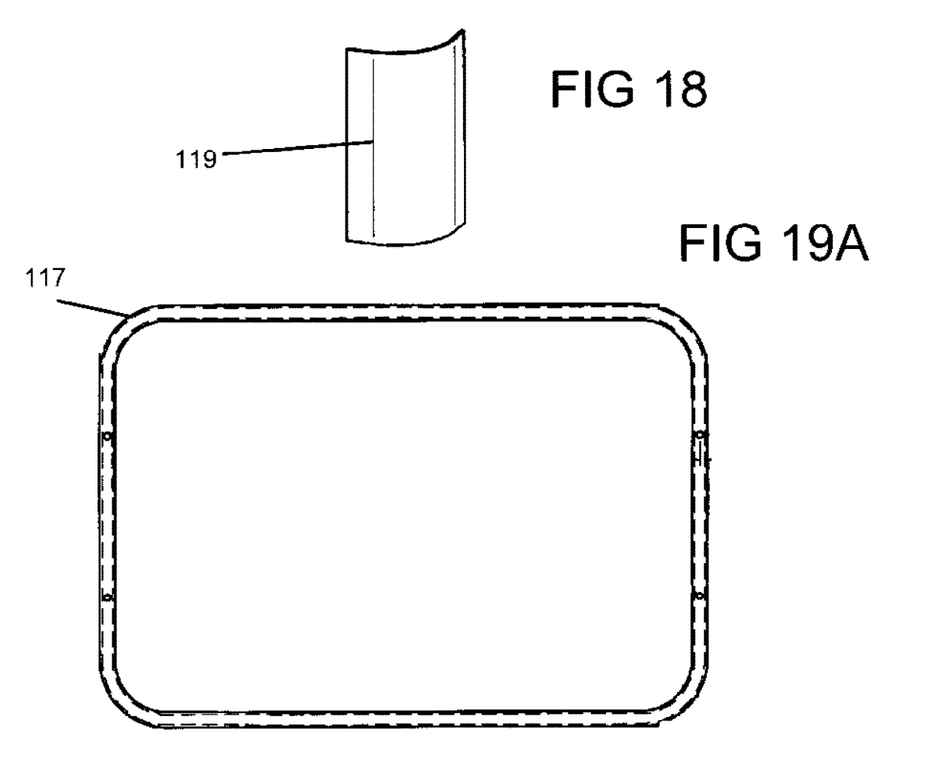
FIG. 18 is a view of a corner panel comprising part of the basket in the embodiment of FIGS. 12-17.
FIG. 19A is a top view of one of the basket railings used in the embodiment of FIGS. 12-18 and FIG. 19B is a cross section view of the basket railing of FIG. 19A.
Figure 19B:
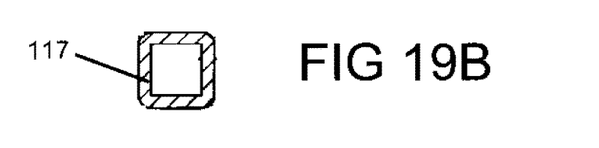

A generally U-shaped channel 40 extends beneath the bottom tubes or stringers 13 from the front end 15 to the rear end 16 of the basket 12. This channel 40 is rigidly secured to the lower rails 17 at the front and back. Channel 40 possess sufficient strength to comprise the principal load bearing member in basket 14. The open channel 40 faces downward and the channel, which preferably comprises a one-piece metal member, has two side walls 42 forming opposite sides of the open, downwardly facing channel 40. Each side wall 42 has at least one opening 48 for receiving a pin or other fastener 44, when the cart 10 is mounted on the support bar 50. Insertion of the support bar 50 in the channel 40 comprises a critical aspect for mounting the cart 10 on a vehicle 2, and this relationship will be subsequently discussed in greater detail.

Figure 6:
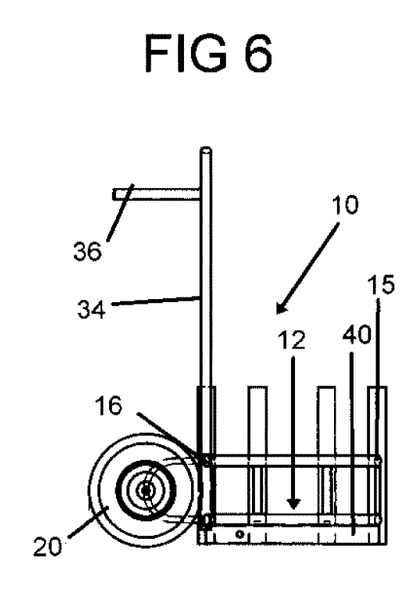
FIG. 6 is a side view of the wheeled hand cart of FIGS. 1 and 2.
Figure 7:
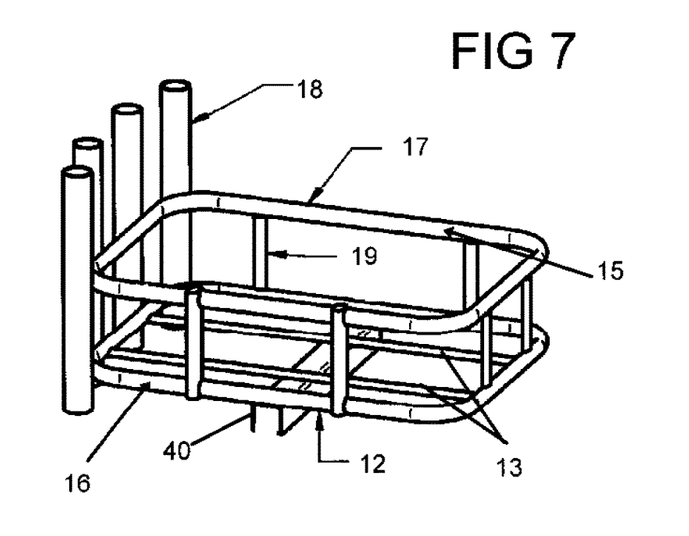
FIG. 7 is a view of the basket which forms the primary load carrying platform, base or shelf of the wheeled hand cart of FIGS. 1 and 2.
Figures 8, 9:
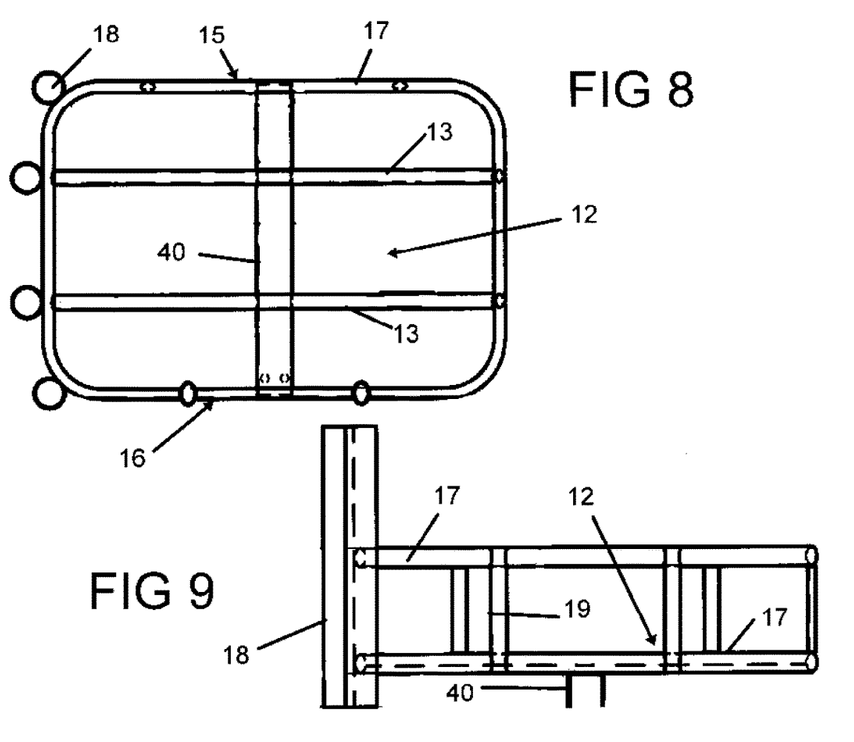
FIG. 8 is a top plan view of the basket or base shown in FIG. 7
FIG. 9 is a front view of the basket of FIG. 7.

Two wheels 20 are mounted on opposite ends of an axle 22 at the rear of the hand cart 20. Two gussets 24, in the form of C-shaped tubular members, have ends attached to the top and bottom rails 17. The axle extends through the two gussets 24, as seen in FIG. 6 so that the wheels 20 can freely rotate, even though the wheels 20 are not spaced outwardly from the basket 12.

A U-shaped handle 30 extends upward from the wheels 20 and the basket 12 at the rear end 16 of the basket 12. The U-shaped handle 30 has two parallel uprights 36 joined by a closed end at the top of the handle. Grips 36 extend further rearwardly from the handle 30. The uprights 36 can be mounted to the basket 12 by inserting the lower ends of the uprights 36 into open ended tubes forming vertical members 17 at the rear end 16 of the basket 16. A detachable fastener secures the handle in the position shown in FIGS. 1 and 2. The handle 30 can be rotated so that the grips 36 extend in the opposite direction from that shown in FIGS. 1 and 2. In that position the grips 36 can be used to support equipment, such as a bicycle when the wheeled hand cart 10 is mounted on the rear of the vehicle 2.

The handle cart 10 can be detachable from the support bar 50 for removal of the cart 10 from the vehicle 2. The support bar 50 is normally mounted in a hitch receiver that is permanently mounted on the rear of a vehicle 2, such as a sports utility vehicle or a truck. The support bare 50 has aligned openings 56 at one end so that the support bar can be attached to the hitch receiver 4 by a pin in a conventional manner. The support bar 50 will then extend beyond the rear of the vehicle 2 as seen in FIG. 1.

Support bar 50 will then function not only as a means to mount the hand cart 10 on the rear of the vehicle 2 as shown in FIG. 2. But will also serve as a stationary reaction surface so that the hand cart 10 can be rotated clockwise from the tilted position shown in FIG. 1 to a horizontal position shown in FIG. 2. To lift the hand cart 10 to the position shown in FIG. 2, the cart 10 is tilted as shown in FIG. 1 with the channel 40 generally aligned with the support bar 50, although tilted relative thereto. The hand cat 10 is then pushed toward the vehicle 2 until the channel 40 slips over the distal end of the support bar 50. The channel sidewalls 42 slide over the sides of the support bar 50. The user then rotates the hand cart 10 clockwise as seen in FIG. 1, with the point of engagement of the support bar 50 on the surface of the channel 60 serving as a fulcrum. A mechanical advantage is provided by the relatively elongate handle, and as the hand cart is tilted in a clockwise position, the channel 40 will progressively slide relative to the support bar 50. A fully loaded hand cart 10 can then be tilted into a position in which the support bar 40 will be received for virtually all of its length in the channel 40, at which time the hand cart 10 will be located in a horizontal loaded position, because the channel 40 is now in a horizontal position, surrounding the support bar 50. Once the holes 46 near the rear of the channel 40 comes into alignment with the holes 54 on the support bar, a fastener in the form of a pin can be inserted through the aligned holes 54 and 46, and the hand cart 10 will then be secured to the support bar 50 and to the vehicle 2. Since the support bar 50 has a generally square cross section, with the top surface being flat, the channel 40, with its flat inside surface extending between side walls 42 will be flush relative to the support bar 50. Any tendency of the hand cart 10 to twist or rotate relative to the support bar 50 will be counteracted by the fastener or pin attaching the channel 40 to the support bar 50. The wheeled hand cart 10 can be removed from the support bar 50 and the vehicle, simply by detaching the channel 40 from the support bar 40 and sliding the hand cart 10 in the opposite direction until the wheels 120 touch the ground. The mechanical advantage allows the load carried by the hand cart to be lifted and lowered by tilting the hand cart 10 and the channel 40 relative to the support bar 50 and sliding the hand cart 10 on and off the support bar 50.

A second embodiment of this invention is shown in FIGS. 12A-12D. Major components of this second embodiment are fabricated from extruded aluminum instead of stainless steel tubing as in the first embodiment. Wheeled hand cart 110 has a basket 112 with a handle 130 extending upwardly from the basket 11 and the wheels 120. The basket 112 is formed using upper and lower rails 117 as in the first embodiment. Instead of using vertical tubing extending between the upper and lower rails 117, basket 112 employs corner panel braces 119 that are formed from flat aluminum stock that is formed into an arc to fit between the upper and lower rails 117.

One significant difference between the hand cart 10 of FIGS. 1 and 2 and the hand cart 110 of FIGS. 12A-12D is the introduction of a roller 148 in the leading end of the channel 140, that can be seen in FIGS. 13A-13E showing the basket 112. The channel 140 supports the base rails 113 as in the first embodiment. The front portion of channel 140 is an open C-channel, but a portion of the channel 140 adjacent the rear of the basket 112 is covered. A roller or roller bearing 148 is mounted to the top face of channel 140 in an opening, so that the roller extends into the channel as seen in FIG. 13F. The channel 140 is aligned with a support bar which extends from its engagement with hitch receiver by a fastener extending through a support bar receiver hole 154 on a vehicle to lift the hand cart 110 to the elevated position as in the first embodiment. Channel 140 includes a roller 148, and the roller 148 will engage the top surface of the support bar 150 during mating, thus reducing the sliding friction as the channel 140 moves over the support bar 150. Since the inclination of the channel 140 relative to the support bar 150 during progressive insertion, there will be sufficient clearance to close the open face of the channel 140 with a panel so that the end of the support bar 150 will be completely covered upon full insertion. In addition to fasteners extending through aligned openings 146 and 156, this complete capture of the leading end of the support bar 140 will further stabilize the hand cart 110 when mounted on the vehicle.

The wheels 120 are mounted on gussets 124 to affix the wheel to the hand cart 110 in the same manner as for hand cart 10. The handle 130, with hand grips 136 are also included on hand cart 110 in substantially the same manner as with hand cart 10.

Figure 20:
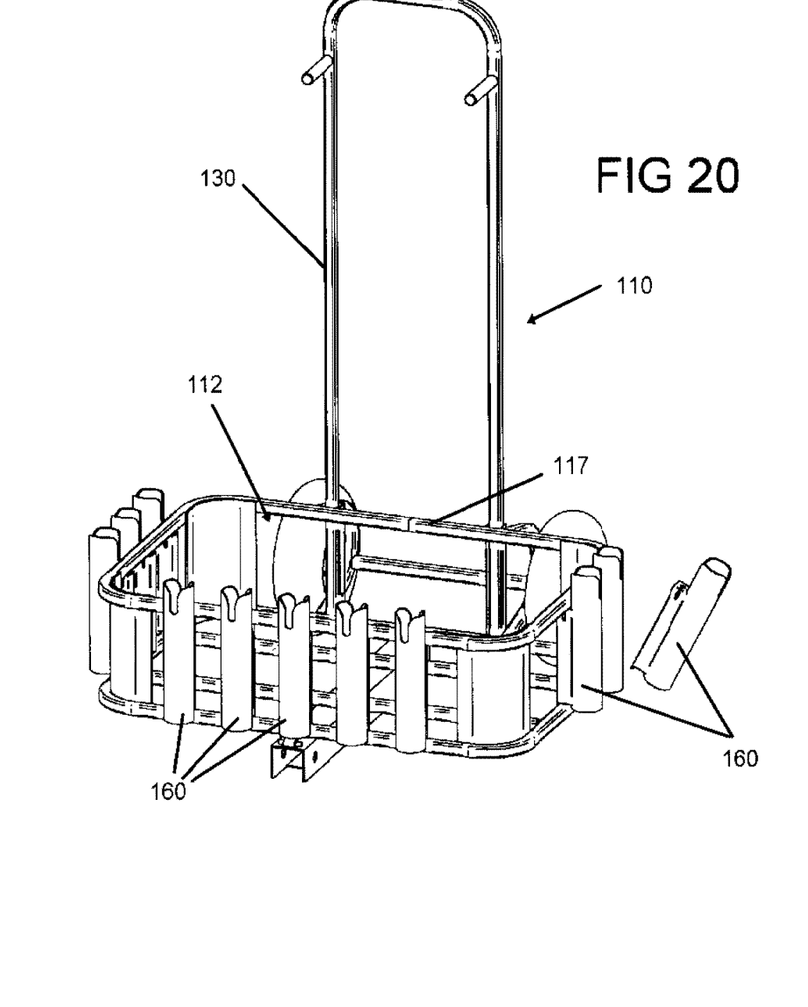
FIG. 20 is a view of the hand cart of FIGS. 12-19 showing a number of detachable auxiliary mounting members in the form of rod holders that can be mounted around the basket.
Figure 21:
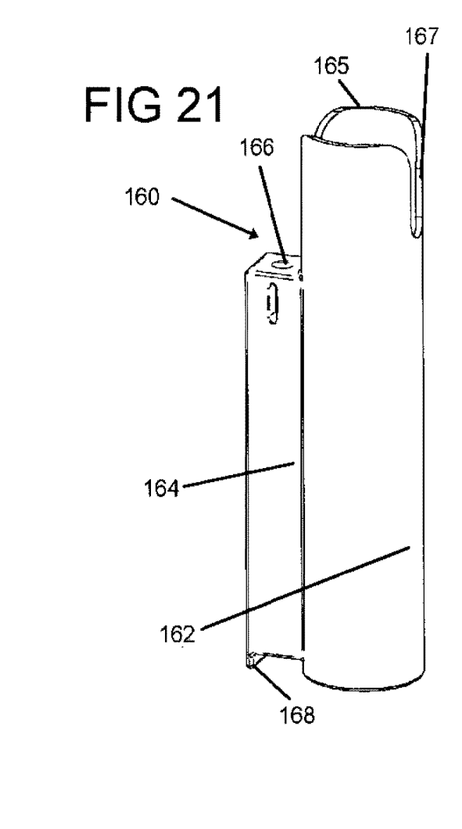
FIG. 21 is a view of one of the detachable rod holders shown in FIG. 20.

FIGS. 20 and 21 show an additional feature that is incorporated into hand cart 110, although the same feature could be incorporated into hand cart 10. Attachable and detachable tubular rod holders 160 can be snapped onto the basket 112 at a number of positions around its exterior. Of course other attachable and detachable mounting devices could be substituted for the tubular fishing rod holders 160, which are merely representative of auxiliary mounting members. The rod holders 160 can be snapped into any location on the basket rails where a suitable mounting hole is located. The mounting holes would not be visible in FIG. 20. These mounting holes would be located on the underside of the top basket rail 117, and a mounting hold is located at each position where a tubular rod holder is shown in FIG. 20. Each of the rod holders 160 includes a cylindrical section 160 in which the butt of a fishing rod could be inserted. The cylindrical section 160 can comprise a plastic tubing which has an open mouth 165 with slots 167 on opposite sides of the mouth. A spring housing 164 extends along one side of the cylindrical section 160. The spring housing 164 can be part of a one piece molded member including the cylindrical section 160 or it could be attached to the cylindrical section. A spring located within housing 164 biases a protrusion 166 upward. When positioned below a corresponding hole in upper rail 117, the protrusion 166 can be snapped into place. A lip 168 protrudes from the bottom of the spring housing 164, and this lip will fit over the lower railing when the rod holder is in position. To detach the rod holder 160, the user merely pushes down on the protrusion 166, which is accessible from the side, to release the rod holder 160.

Detachment of the rod holder 160 from the basket 112 allows the rod holders 160 to be used in at least two different applications. First, the detachable rod holder 160 can, in combination with a sand spike mounted thereon, be used to hold a fishing rod in position, especially when used for surf fishing. Second, this detachable rod holder 160 can also be used for storing fishing rods. A frame consisting of upper and lower straight members can be mounted on a wall in a garage or similar location. The rod holders 160, with fishing rods mounted therein, can be removed from the wheeled hand cart 110 and snapped into the wall mounted rails. This provides a simple means for orderly storage of fishing rods. The detachable holders 160 need not be limited to fishing rod holders, nor must they be cylindrical. Another mounting section could be substituted for the cylindrical mounting section.

The preferred embodiments have been described in terms of their use in manually transporting sporting gear. For instance they would be especially suitable for use in fishing and even more especially for use in surf fishing. This is, however, not the only suitable use for such a wheeled hand cart that can be loaded onto a motor vehicle or trailer, and then used to provide the user with mobility at a sight. For example this invention could be used at a construction site or for use, either professionally or otherwise, in lawn care or gardening. These wheeled handcarts could also be used by someone who must transport articles to a location and then move the articles about to site where they are to be used or consumed. For example, they could be used by caterers.

Figure 22:
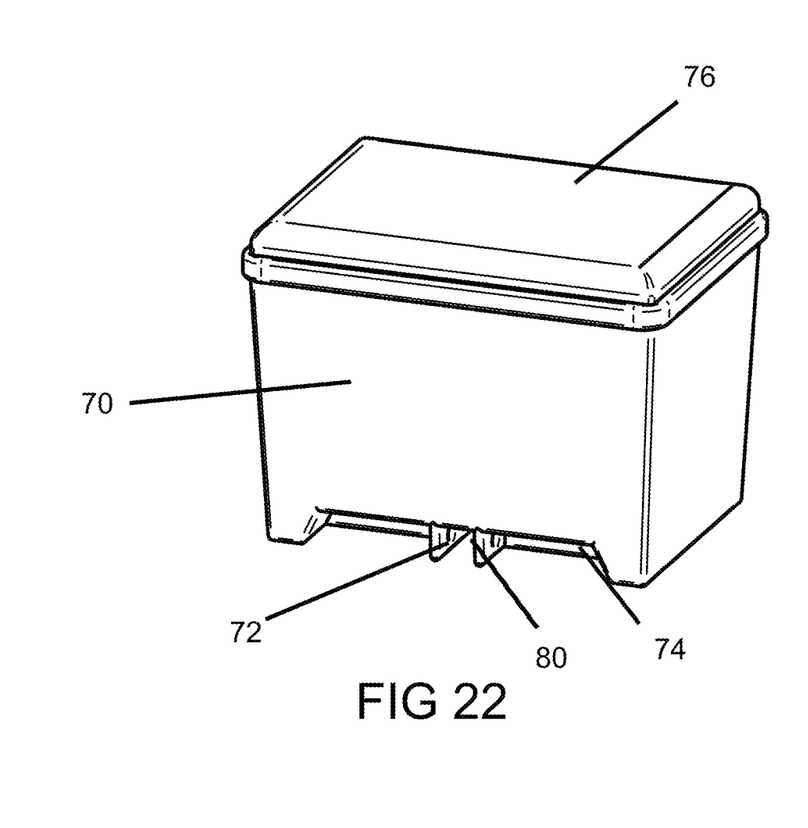
FIG. 22 is a view of a cooler that can be mounted on a trailer hitch extension.
Figures 23, 24:
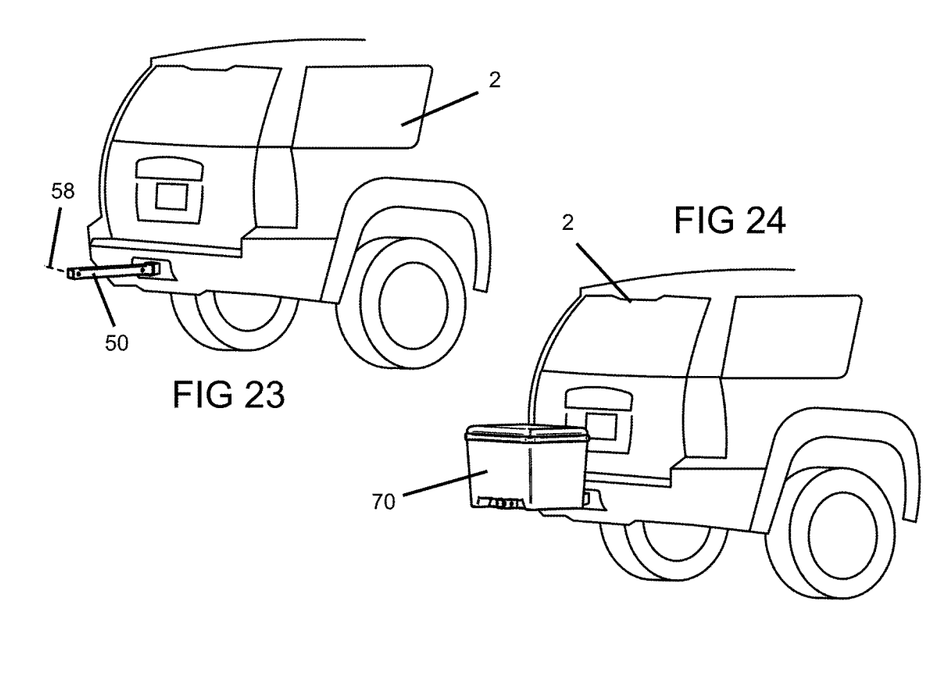
FIG. 23 shows the trailer hitch extension on which the cooler of FIG. 22 can be mounted.
FIG. 24 shows the cooler of FIG. 22 mounted on the trailer hitch extension of FIG. 23.

In addition to providing means for mounting a cart to the rear of a vehicle, the support bar extension 50 also provides a means for mounting a container, such as a cooler 70 of the type shown in FIGS. 22-24, to the rear of a vehicle. As seen in FIG. 22, the cooler 70 can comprise an insulated member fabricated from plastic or suitable material for keeping its contents cool and for preventing ice from melting. The cooler 70 comprises a conventional open container base with a conventional lid 76 mounted thereon. The bottom of the container base of cooler 70 provides means for securing this cooler to the support bar extension 50. A channel 80, extending from the front to the rear of cooler 70, is wide enough so that the support bar 50 will fit in this channel 80.

Two ears 72 are located at the front of the channel 80 and extend downwardly one on each side of channel 80. These ears 72 have aligned holes, through which a securing pin 58 can be inserted to secure the cooler 70 to the support bar 50. A notch 74 extends generally between opposite sides of the bottom of the cooler 70 and transverse to the channel 80 as shown in FIG. 22, and the ears 72 protrude into the notch 74. The notch 74 provides access to the ears 72, so that the securing pin 58 can be easily inserted through the holes in ears 72 and can be removed therefrom.

The channel 80, the ears 72 and the notch 74 can be formed when the cooler 70 or parts thereof are molded, and thus formation of these distinct elements will not require significant additional labor. Since none of these features extend beyond the rest of the lower surface of the cooler, the cooler 70 can still be used in a normal manner, and it can be removed and transported and will still sit on a generally flat surface. Another version of this cooler 70 can include wheels so that it can be easily transported.

FIG. 23 shows the support bar 50 and the securing or locking pin 58 that can be inserted through aligned holes near the rear end of the support bar 50. As previously discussed, this support bar 58 is attachable directly to the hitch receiver on the vehicle 2. FIG. 24 shows the cooler 70 as it would be mounted on the support bar 50. Since the channel 80 extends through the middle of the cooler 70, which can essentially be balanced on the single support bar 50. When the cooler 70 is positioned with the support bar 50, extending through the channel 80, the holes in the ears 72 can be aligned with the holes on the end of the support bar 50. A single pin 58 can then be inserted through all four aligned holes, and the cooler 80 will be adequately mounted and secured on the support bar 50. Since the notch 74 will be exposed on the rear, access to the holes in the ears 72 and the support bar 50, there will be adequate clearance to insert and remove the pin 58.

Although especially suited for use with a cooler 70 intended for recreational purposes, this same mounting arrangement may be included on a container used for storing implements for commercial, construction, medical or other applications where it would be desirable to provide easy access the container as well as permitting a portable container to be easily mounted and removed from the vehicle.

We claim:

1. A portable cooler mountable on a support bar extending rearwardly from a vehicle, the portable cooler comprising:
   a container base and a container lid;
   a channel extending into a bottom surface of the container base between a front and a rear face of the container base and spaced from opposite sides of the container base;
   a notch extending along the front face where the front face intersects the bottom surface, the notch extending transverse to and laterally beyond the channel;
   ears on each side of the channel protruding into the notch but not into the channel and extending below the bottom surface of the container base, with aligned holes extending through the ears, the notch being wide enough to provide clearance for insertion of a pin through the holes in the ears;
   wherein the cooler can be mounted on a single support bar attached to the vehicle and extending through the channel with the pin extending through the bar and into the holes in the ears to secure the cooler to the support bar.

2. The portable cooler of claim 1 wherein the channel and the ears and the notch are molded into the bottom surface of the cooler.

3. An assembly for mounting a container on the rear of a vehicle, the assembly comprising:
   a single support bar extending from a receiver hitch on the rear of the vehicle
   the container comprising a container base and a container lid;
   a channel extending into a bottom surface of the container base between a front and a rear face of the container base and spaced from opposite sides of the container base;
   a notch extending along the front face where the front face intersects the bottom surface, the notch extending transverse to and laterally beyond the channel;
   ears at each side of the channel protruding into the notch but not into the channel and extending below the bottom surface of the container base, with aligned holes extending through the ears, the notch being wide enough to provide clearance for insertion of a pin through the holes in the ears;
   the container being mountable only on the single support bar attached to the vehicle and extending through the channel with the pin extending through the bar and into the holes in the ears to secure the container to the support bar.

4. The assembly of claim 3 wherein the container comprises a molded cooler.

5. The assembly of claim 3 wherein the support bar comprises a straight member.

6. The assembly of claim 3 wherein the support bar comprises a tubular member having a generally rectangular cross section, with two sets of aligned openings extending through opposite side walls adjacent opposite ends of the support bar.

7. The assembly of claim 6 wherein the support bar has a constant cross section between opposite ends thereof, with the exception of the two sets of aligned openings.

8. The assembly of claim 3 wherein the support bar is detachable from the hitch receiver.

9. The assembly of claim 3 wherein the channel is open, facing downward, between both ends thereof.

10. A method of mounting portable container assembly, on a vehicle for transporting the portable container assembly with the vehicle, comprising the steps of:
    attaching a support bar to a hitch receiver on the vehicle so that that support bar extends horizontally from the vehicle to a point spaced from the vehicle;
    tilting the portable container assembly with one end tilted upward;
    aligning a downwardly facing channel on the portable container assembly with the support bar with the channel initially extending at an angle relative to the support bar;
    rotating the portable container assembly to an elevated horizontal position, with a point of engagement of the channel with the support bar acting as a fulcrum, until the channel is axially aligned with the support bar;
    sliding the channel mounted on the container assembly along the support bar until the support bar extends through a majority of the channel's length; and
    fastening the container assembly to the support bar by pinning a pair of ears on the portable container assembly adjacent to and spaced from the channel and extending from the bottom surface so that the portable container assembly may be transported by the vehicle.

11. The method of claim 10 wherein the container assembly comprises a container base and a container lid, and the downwardly facing channel which extends into a bottom surface of the portable container assembly.

12. The method of claim 11 wherein the channel is located on the container base.

13. The method of claim 10 wherein the container assembly comprises a cooler.

14. The method of claim 10 wherein the container assembly comprises a rolling cart receiving a container for storing articles.

15. The method of claim 14 wherein the channel is located on the rolling cart.

16. The method of claim 15 wherein the rolling cart includes wheels at one end thereof so that the rolling cart can be tilted on the wheels to align the channel with the support bar with the rolling wheels forming another fulcrum.

17. The method of claim 16 wherein the cart includes a frame for supporting articles and the frame is tilted by a handle extending above the frame and forming a lever arm for tilting a loaded cart.

18. The method of claim 14 wherein the support bar is detachable from the hitch receiver.

19. The method of claim 14 wherein the support bar is fastened to the channel to fasten the rolling cart to the support bar.

20. The method of claim 14 wherein the rolling cart includes rails to prevent articles loaded on the rolling cart from falling off as the rolling cart is moved to the elevated position.

* * * * *